United States Patent
Kurashima et al.

(10) Patent No.: US 6,173,314 B1
(45) Date of Patent: *Jan. 9, 2001

(54) APPLICATION SHARING SYSTEM WITH USER MANAGED ADDRESS FOR CONFERENCING

(75) Inventors: Akihisa Kurashima; Shigeru Tagashira, both of Tokyo (JP)

(73) Assignee: Nec Corporation, Tokyo (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/986,937

(22) Filed: Dec. 8, 1997

(30) Foreign Application Priority Data

Dec. 6, 1996 (JP) .................................... 8-342548

(51) Int. Cl.[7] ........................................ G06F 15/16
(52) U.S. Cl. ........................... 709/204; 370/261; 709/227
(58) Field of Search .................................. 709/204, 205, 709/206, 220, 222, 227, 228, 248, 300, 400, 302, 207, 328, 310; 370/260, 270, 432, 433, 261; 345/330

(56) References Cited

U.S. PATENT DOCUMENTS

| 5,247,615 | * | 9/1993 | Mori et al. ............................. 709/205 |
| 5,375,068 | * | 12/1994 | Palmer et al. ......................... 709/204 |
| 5,572,582 | * | 11/1996 | Riddle . |
| 5,610,941 | * | 3/1997 | Tanaka et al. . |
| 5,680,392 | * | 10/1997 | Semaan ................................. 370/261 |
| 5,764,904 | * | 6/1998 | Kurashima ........................... 709/208 |
| 5,771,352 | * | 6/1998 | Nakamura et al. ................... 709/227 |
| 5,832,229 | * | 11/1998 | Tomoda et al. ....................... 709/227 |
| 5,841,763 | * | 11/1998 | Leondires et al. ................... 370/260 |
| 5,867,653 | * | 2/1999 | Aras et al. ............................ 709/204 |

FOREIGN PATENT DOCUMENTS 6-83785    3/1994   (JP) .

OTHER PUBLICATIONS

Watabe et al.: 9th Annual International Pheonix Conference on Computers and Communication; "A Distributed Multiparty Desktop Conferencing System and its Architechure"; p386–393, Mar. 1990.*

(List continued on next page.)

*Primary Examiner*—Mark H. Rinehart
*Assistant Examiner*—Marc D. Thompson
(74) *Attorney, Agent, or Firm*—Foley & Lardner

(57) ABSTRACT

The object is to provide an application sharing system enabled to use communication paths efficiency by selectively using multicast communication and unicast communication and to be configured of user terminals alone by providing each terminal with a function to manage a conferencing group. Group information managing sections manage conferencing group information in a distributed manner, and the information is exchanged between terminals. Intra-group control sections manage conferencing groups, only one such section operating for one conferencing group. An application program communicates with application programs of other terminals through an API processing section, via a point-to-point communicating section in unicast communication, or via a multicast communicating section in multicast communication. A program start-up section controls the starting and ending of required processings.

20 Claims, 11 Drawing Sheets

OTHER PUBLICATIONS

Ohmori et al.; 4th IEEE ComSoc International Workshop on Multimedia Communication; "Distributed cooperative Control for Application Sharing Based on Mutliparty and Multimedia Desktop Conferencing System: Mermaid"; p122–131.*

Ohmori et al.; Supercomm/Icc '92; IEEE International Conference on Communications; "Discovering a New World of Communications"; p1069–1075, vol. 2, Jun 1992.*

ZeinElDine et al.; IEEE Symposium on Computers and Communications; "Multicasting in Interconnected Networks"; p313–319, Jun 1995.*

Abe et al., "Distributed Cooperative Control for Sharing Applications Base on the Mermaid Multiparty and Multimedia Desktop Conferencing System" *NEC Corporation* 34:122–131 (1993).

* cited by examiner

Fig.8

| IP MULTICAST ADDRESS FOR CONFERENCING GROUP (4 BYTES) | NAME OF CONFERENCE (20BYTES) | CONFERENCE IDENTIFYING FLAG (1BIT) 0=OPEN,1=CLOSED | CONFERENCING SYSTEM IDENTIFIER | OPTION PARAMETER (ANY LENGTH) |
|---|---|---|---|---|
| 224.0.0.1 | MARKET RESEARCH | 1 | 1 | optionA |
| 224.0.0.2 | PRODUCT DEVELOPMENT | 1 | 1 | optionB |
| 224.0.0.3 | CONSULTATIVE MEETING | 0 | 1 | optionC |

Fig.9

| CONFERENCING SYSTEM IDENTIFIER (8 BITS) | NAME OF CONFERENCING SYSTEM | NAME OF PROGRAM START-UP CONTROL SECTION |
|---|---|---|

| 1b | SYSTEM A | start A.exe |
|---|---|---|
| 10b | SYSTEM B | start B.exe |
| 11b | SYSTEM C | start C.exe |

APPLICATION SHARING SYSTEM WITH USER MANAGED ADDRESS FOR CONFERENCING

BACKGROUND OF THE INVENTION

1. Field of the Invention

The present invention relates to an application sharing system for exchanging and sharing information among a plurality of terminal apparatuses in a conferencing system utilizing information processing apparatuses including a computer and communication equipment.

2. Description of the Related Art

Application sharing systems according to the prior art include systems which enable a plurality of terminals to share the result and process of the execution of an application program by multicast delivery of information not dependent on any application program to the same application program in response to an input from any terminal, disclosed in the Japanese Patent Application Laid-open No. Hei-6-83785 or a paper by ABE et al. entitled "Distributed Cooperative Control for Sharing Applications Based on the MERMAID Multiparty and Multimedia Desktop Conferencing System" published in NEC Corporation, NEC RESEARCH & DEVELOPMENT, Vol. 34, No., pp. 122–131, January 1993.

The term "application sharing" means the sharing of the result of processing of multicast operation of a single application by a plurality of users from their respective terminals, and the term "application program", collaborating application programs operating on different terminals as if they were a single application program and realizing application sharing by carrying out processing while exchanging information among one another.

FIG. 11 is a block diagram illustrating the overall configuration of the system, out of the techniques according to the prior art referred to above, disclosed in the Japanese Patent Application Laid-open No. Hei-6-83785. Referring to FIG. 11, this system is provided with a plurality of terminal systems 11, 12 and 13 and a terminal system 10 including one multicast communication control means 120. Since the terminal systems 11, 12 and 13 have the same configuration, only the terminal system 11 will be described below as representative of the plurality of systems.

The terminal system 11 has execution control means for an application program 531 consisting of event providing means 541, event analyzing means 551, message communicating means 571 and procedure executing means 561. The event providing means 541 enters event information into the event analyzing means 551, which analyzes the entered event, prepares a message for requesting the execution of a processing procedure for the application program, adds to or includes in the message information required for sharing action, and enters the message into the message communicating means 571, which in turn transmits the message to the multicast communication control means 120 via a line 21.

The multicast communication control means 120, utilizing the information added to or included in the received message, transmits this message to message communicating means of the plurality of terminal systems 12 and 13; the message communicating means 572 and 573 in the terminal systems 12 and 13 extract from the messages received from the multicast control means 120 via lines 22 and 23, respectively, the information (necessary information for sharing action) added to or included in the messages, enter the information into procedure executing means 562 and 563 of the application programs 532 and 533, respectively; and the procedure executing means 562 and 563 perform processing using the respectively entered messages; and the application programs on the plurality of terminal systems 11, 12 and 13 process event information generated on the respective terminal systems, and obtain the same result of execution. In this manner, an application program is shared by the plurality of terminal systems 11, 12 and 13 on a real time basis.

However, the above-described system according to the prior art involves the problem that, where the same information is subjected to multicast delivery from one application to a plurality of other applications, the multicast communication control means is used and, since the multicast communication control means use consecutive multicast communication, i.e. information being individually delivered to each application, the cost of multicast communication per item of information increases in proportion to the number of terminals.

The prior art system described above also involves the problem of complexity of processing at the time of starting or ending the system because the multicast communication control means is independent of other programs and operates by itself.

Furthermore, the conventional system described above involves the problem that the terminals can participate in only a specific conferencing system on account of the lack of means to permit participation in any desired one out of a plurality of conferencing systems.

It also has the problem of requiring another terminal (for instance the terminal 10 provided with the multicast communication control means 120 in FIG. 11) separately from the terminals of users participating in the conference.

Moreover, the prior art system involves the problem that application sharing is impossible among terminals not connected to the same communication network because it presupposes the connection of any terminal to the same communication network as other terminals.

Therefore, the object of the present invention, attempted in view of the above-described circumstances, is to provide an application sharing system which makes it possible to use a communication path at a favorable transfer efficiency by differentiated use of multicast communication and unicast communication, to compose a conferencing system of user terminals alone by providing each terminal with a function to manage a conferencing group and, where there are a plurality of communication paths, to choose the optimal path.

SUMMARY OF THE INVENTION

According to the invention, each of a plurality of terminals is provided with a multicast communicating section for multicast transmission of information from one of the terminals to the rest of the plurality of terminals by using the multicast delivery function of a network; a point-to-point communicating section for transmitting information to the plurality of terminals by using a group communicating section for performing consecutive multicast delivery to each terminal; and two communicating sections, wherein the cost of multicast delivery of information is reduced by making one of these communicating sections selectable.

Further according to the invention, automation of the starting and ending of the system and of the processing of holding of, participating in, retiring from and adjourning of a conference can be realized by using a configuration in which all the constituent elements and means included in each terminal are interconnected.

The invention also makes possible participation in a plurality of conferencing systems by having conferencing group information include the type of conferencing system.

The invention further makes possible structuring of a system without requiring any additional apparatus other than users' terminals by having each terminal include an intra-group control section for managing a conferencing group and distributing conferencing group information so as to be managed by each terminal.

The invention also enables, where a conferencing group is to be formed of terminals each having a plurality of communication paths, the conferencing group, when a conference is to be held, to choose the most suitable communication path for it by enabling the participating terminals to search communication paths available to them and to find the intended conferencing group.

More specifically, according to the invention, there is provided an application sharing system composed of a plurality of terminals connected via a network, each of said plurality of terminals comprising:

a group information managing section for entering, at the instruction of a user information for convening or participating in a conferencing group;

a program start-up managing section, started up by said group information managing section with information for convening or participating in said conferencing group as parameter, for controlling a program for convening or participating in said conferencing group;

an intra-group control section, started up by said program start-up managing section when information for participating in said conferencing group is entered from said group information managing section; and a terminal control section, started up by said program start-up managing section with information for convening or participating in said conferencing group as parameter, for registering participating in the conferencing group by effecting connection to said intra-group control section of a terminal convening a conferencing group out of said plurality of terminals.

In the above-stated configuration, each of said plurality of terminals may further include:

an application processing section for executing an application program started up by said terminal control section;

a point-to-point communicating section for receiving transmit information and transmit destination terminal information from said application processing section;

a group communicating section, started up by said intra-group control section, for transmitting, upon receiving said transmit information and transmit destination terminal information from said point-to-point communicating section, the transmit information to a terminal indicated by the transmit destination terminal information; and a multicast communicating section for receiving transmit information and receiving side terminal information from said application processing section and transmitting the transmit information augmented with the receiving side terminal information.

BRIEF DESCRIPTION OF THE DRAWINGS

FIG. 8, a diagram intended for helping describe the embodiment of the invention, shows an example of contents of a group information management table.

FIG. 9, a diagram intended for helping describe the embodiment of the invention, shows an example of contents of a conferencing system management table.

DETAILED DESCRIPTION OF THE PREFERRED EMBODIMENTS

Preferred embodiments of the present invention will be described below with reference to the drawings.

Figure 1:
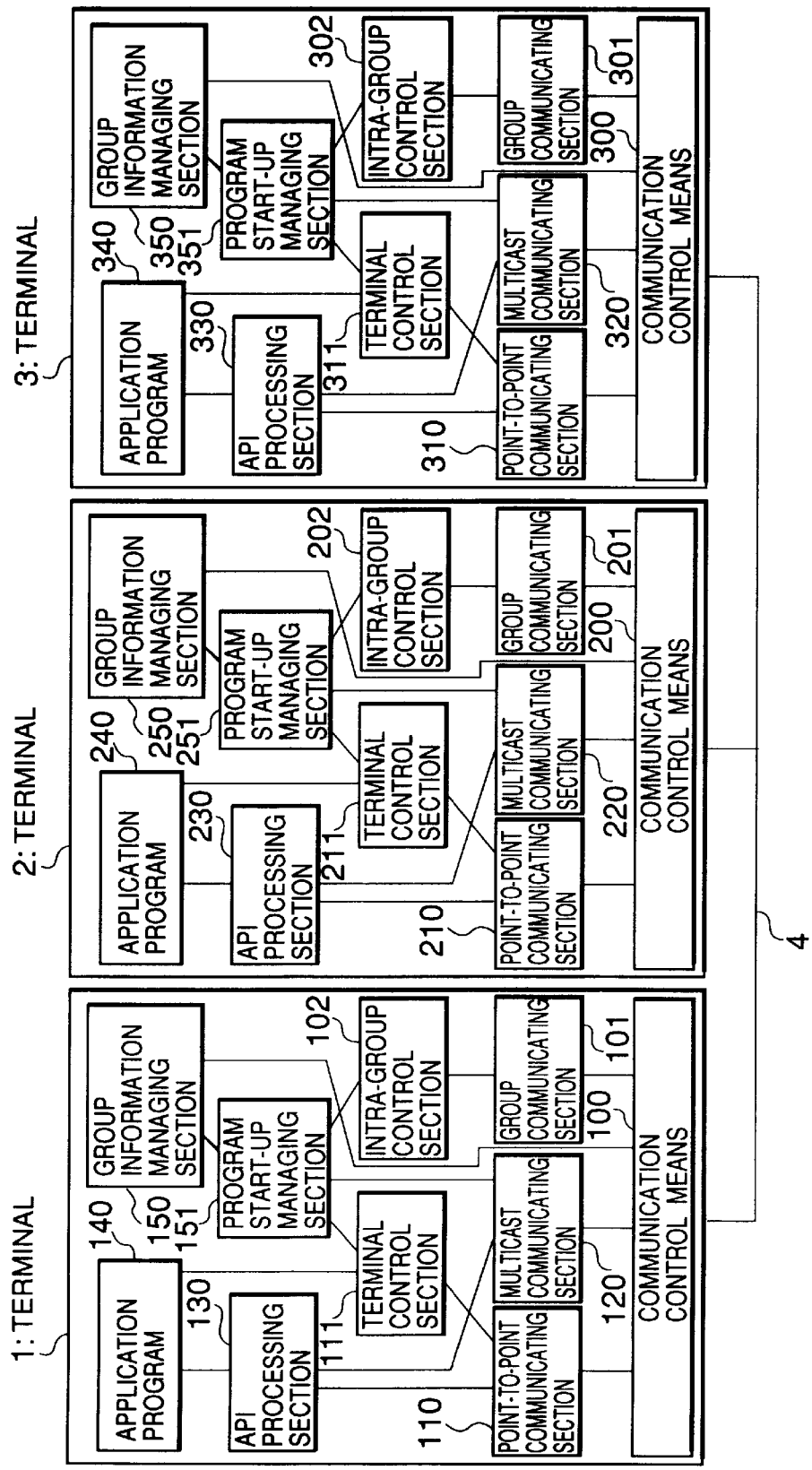
FIG. 1 is a diagram illustrating the overall configuration of a preferred embodiment of the present invention.

Referring to FIG. 1, a preferred embodiment of the invention consists of a plurality of terminals 1, 2 and 3.

A terminal 1 has communication control means 100, a group communicating section 101, an intra-group control section 102, a point-to-point communicating section 110, a terminal control section 111, a multicast communicating section 120, an API processing section 130, an application program 140, a group information managing section 150, and a program start-up managing section 151. Terminals 2 and 3, configured similarly to the terminal 1, respectively have communication control means 200 and 300, group communicating sections 201 and 301, intra-group control sections 202 and 302, point-to-point communicating sections 210 and 310, terminal control sections 211 and 311, multicast communicating sections 220 and 320, API processing sections 230 and 330, application programs 240 and 340, group information managing sections 250 and 350, and program start-up managing sections 251 and 351.

The terminals 1, 2 and 3 are connected to a network 4 and in a mutually communicable state.

Two methods of communication are available to the communication control means of the terminal.

One is a method of point-to-point communication between two terminals, typical of which is used in connection-type communication, such as communication over a telephone network or communication by TCP communication in transmission control protocol/internet protocol (TCP/IP) communication.

The other is a method of point-to-multipoint communication, wherein information originating from one terminal is received by a plurality of terminals. This is realized as communication of connection-less type, examples of which including radio communication including broadcasting, multicasting in TCP/IP, and communication using IP packets.

Although the terminals 1, 2 and 3 have their own intra-group control sections 102, 202 and 302, respectively, only one intra-group control section among them is used within one conferencing group even if a plurality of terminals are participating.

Methods to determine which intra-group control section is to be operated include one whereby the intra-group control section of the terminal of the user who was the first to convene a conferencing group is operated.

Therefore, information from the point-to-point communicating sections 110, 210 and 310 of the terminals 1, 2 and 3, respectively, is sent to whichever is in operation out of the group communicating sections 101, 201 and 301 of the terminals 1, 2 and 3, respectively.

The group communicating sections 101, 201 and 301 of the terminals 1, 2 and 3, respectively, are intended to exchange information with the point-to-point communicating sections 110, 210 and 310 of the respective terminals. To enable the intra-group control sections 102, 202 and 303 and the terminal control sections 111, 211 and 311 to exchange information with each other by using these paths, the group communicating sections 101, 201 and 301 also operate, within a single conferencing group, only on the terminal where the intra-group control section 102, 202 or 302 is operating.

When the terminal control sections 111, 211 and 311 of the terminals 1, 2 and 3, respectively, exchange information with one another, the exchange takes place from the point-to-point communicating sections 110, 210 and 310 via the communication control means 100, 200 and 300 and one of the group communicating sections. In this exchange, according to the method of instruction to the group communicating section, it is possible either to send information to a specific terminal control section, or to deliver the same information to the terminal control sections of any plurality of terminals out of the terminals participating in the conferencing group. Information transmitted from the multicast communicating sections 120, 220 and 320 of the terminals 1, 2 and 3, respectively, is received by all of the multicast communicating sections 120, 220 and 320. In this process, it is made possible for any terminal to discard any multicasted signal received but not destined therefor by burying a destination identifying code in the transmitted information.

The application programs 140, 240 and 340 of the terminals 1, 2 and 3 are started up by the terminal control sections 111, 211 and 311, respectively.

The application programs 140, 240 and 340 of the terminals 1, 2 and 3 exchange information with application programs of other terminals via the API processing sections 130, 230 and 330, respectively.

The API processing sections 130, 230 and 330 of the terminals 1, 2 and 3, responding to requests from the application programs 140, 240 and 340, respectively, send information either from the point-to-point communicating sections 110, 210 and 310 to the group communicating sections 101, 201 and 301 via the communication control means 100, 200 and 300, or from the multicast communicating sections 120, 220 and 320 to the multicast communicating sections of other terminals via the communication control means 100, 200 and 300, respectively.

Next, the preferred embodiment of the present invention will be described in further detail to make known the above-described form of implementing the invention even more clearly.

Figure 2:
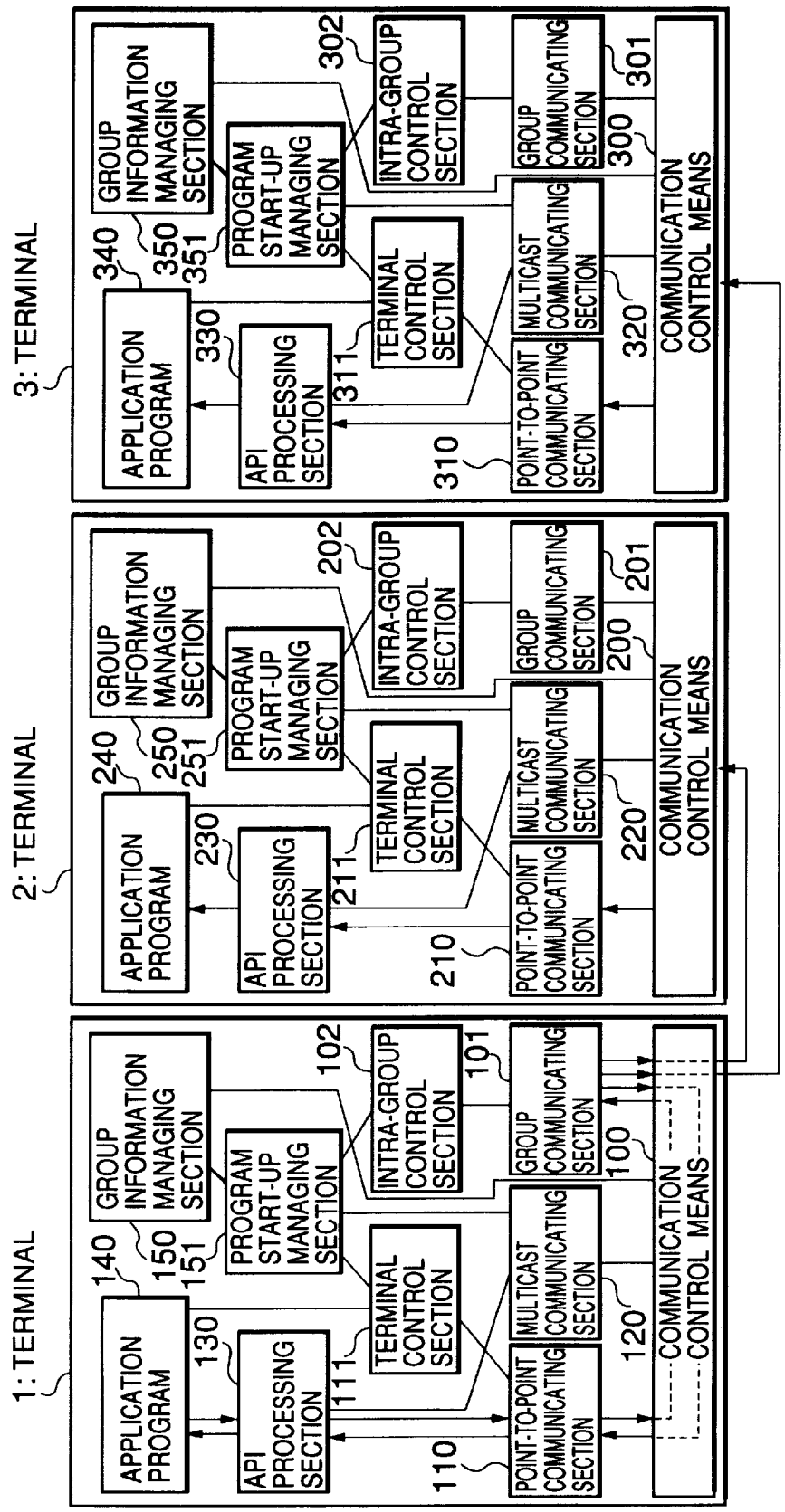
FIG. 2, a diagram intended for helping describe the operation of the embodiment of the invention, illustrates an example of data flow taking place when application programs communicate with one another through application processing interface (API) processing sections and point-to-point communicating sections using group communicating sections.

FIG. 2 illustrates how, at the terminal 1, the API processing section 130 transmits information from the point-to-point communicating section 110 in response to a request from the application program 140.

Referring to FIG. 2, at the terminal 1, the point-to-point communicating section 110 sends information to the group communicating section 101 via the communication control means 100, and the group communicating section 101, having received this information, transmits it to the point-to-point communicating section 110 and the respective point-to-point communicating sections 210 and 310 of the terminals 2 and 3 via the communication control means 100 of the terminal 1 and the respective communication control means 200 and 300 of the terminals 2 and 3. The information finally reaches the application program 140 of the terminal and the respective application programs 240 and 340 of the terminals 2 and 3 via the API processing section 130 of the terminal 1 and the respective API processing sections 230 and 330 of the terminals 2 and 3.

In this manner, information can be sent from any one terminal to a plurality of terminals in any combination out of the terminals participating in the conferencing group.

In order to select the destination, the point-to-point communicating section 110 of the terminal 1 on the transmitting side adds information on the destination, and sends the augmented information to the group communicating section 101.

The group communicating section 101, referring to the destination information, selects the terminal to which the received information is to be sent, and delivers it to the point-to-point communicating section of the designated terminal. Designation of the destination is notified to the point-to-point communicating section 110 from the application program 140 of the transmission-originating terminal 1 via the API processing section 130.

Figure 3:
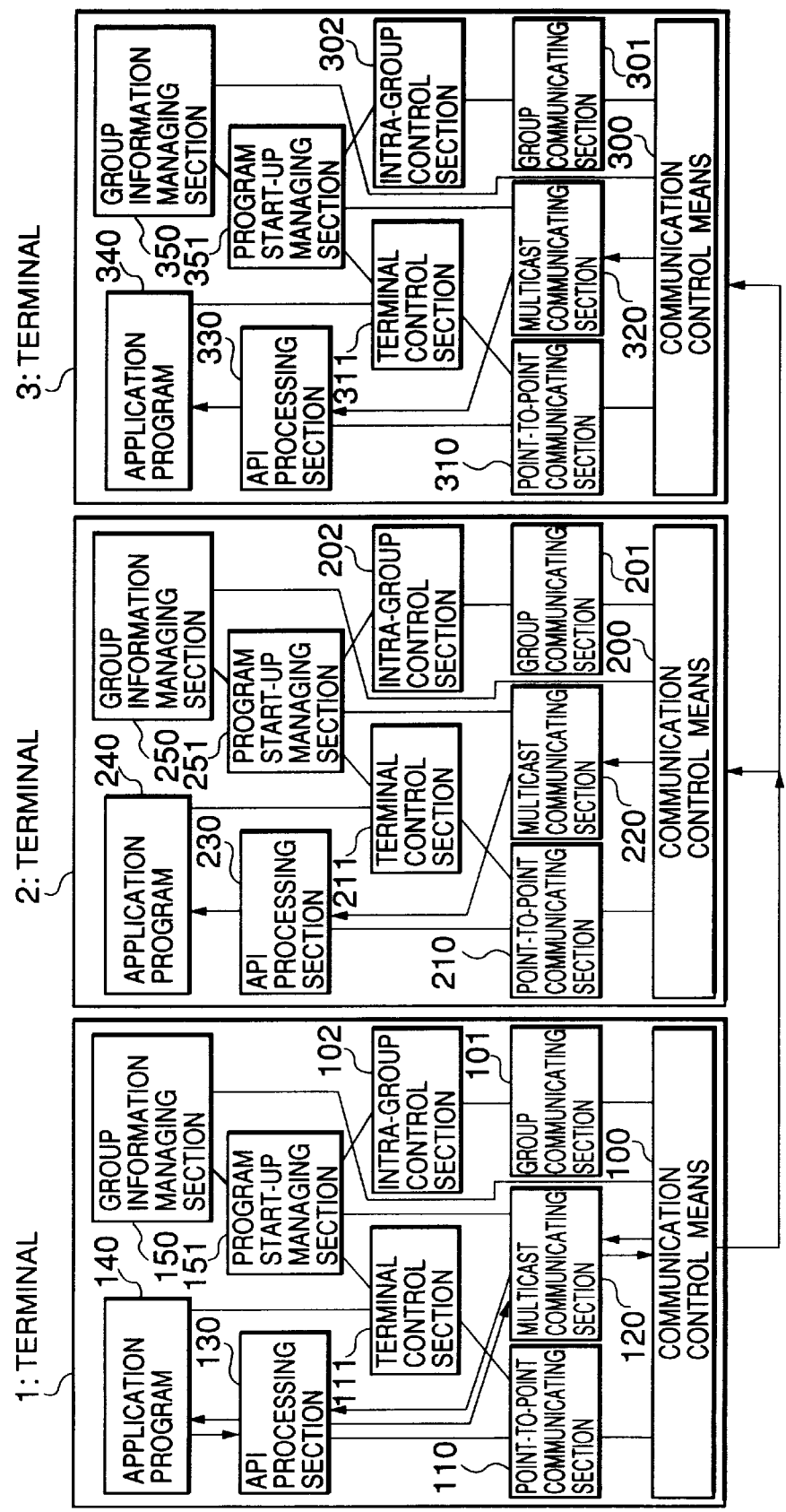
FIG. 3, a diagram intended for helping describe the operation of the embodiment of the invention, illustrates an example of data flow taking place when application programs communicate with one another through API processing sections using multicast communicating sections.

FIG. 3 illustrates an instance in which, at the terminal 1, the API processing section 130 transmits information from the multicast communicating section 120 in response to a request from the application program 140.

Referring to FIG. 3, at the terminal 1, the multicast communicating section 120 sends information to the multicast communicating section 120 of the terminal 1 and the respective multicast communicating sections 220 and 320 of the terminals 2 and 3 via the communication control means 100 of the terminal 1 and the respective communication control means 200 and 300 of the terminals 2 and 3, and the information finally reaches the application program 140 of the terminal 1 and the respective application programs 240 and 340 of the terminals 2 and 3 via the API processing section 130 of the terminal 1 and the respective API processing sections 230 and 330 of the terminals 2 and 3.

In this manner, information can be sent from any one terminal to a plurality of terminals in any combination out of the terminals participating in the conferencing group.

In order to select the destination, the point-to-point communicating section 110 of the terminal 1 on the transmitting side adds information on the destination, and sends the augmented information to the respective multicast communicating sections 120, 220 and 320 of the terminals 1, 2 and 3.

Each of the respective multicast communicating sections 120, 220 and 320 of the terminals 1, 2 and 3, referring to the destination information, sends only the information destined therefor to the API processing sections 130, 230 and 330, and discards what is not destined therefor.

Designation of the destination is notified to the multicast communicating section 120 from the application program 140 of the transmission-originating terminal 1 via the API processing section 130.

Referring back to FIG. 2, in consecutive multicast communication between application programs via the group communicating section 101 of the terminal 1, the sequence of arrivals of different pieces of information at the terminals is ensured. Thus, even if each of a plurality of terminals transmits information at random, the pieces of information arrive at different terminals in the order of their arrivals at the group communicating section 101. Therefore, the application program of each terminal can make their states identical by performing process in the sequence of the arrivals of information. However, the quantity of communication flowing over the network increases as much as information travels via the group communicating section.

Meanwhile, referring again to FIG. 3, in the communication between application programs by the multicast delivery function of the network via the respective multicast communicating sections 120, 220 and 320 of the terminals 1, 2 and 3, the sequence of arrivals of different pieces of information at the different terminals is not ensured. In other words, the pieces of information do not necessarily arrive at other terminals in the same order as they reach one terminal.

However, as the multicast delivery function of the network is utilized, the quantity of communication flowing over the network to transmit the same information to a plurality of terminals can be minimized.

The respective application programs 140, 240 and 340 of the terminals 1, 2 and 3 can choose as appropriate between consecutive multicast communication between application programs via the group communicating section 101 (if the transmitting party is the terminal 1) and communication between application programs by the multicast delivery function of the network via the multicast communicating sections 120, 220 and 320. Whether to choose consecutive or simultaneous multicast communication is instructed by the respective API processing sections 130, 230 and 330 of the terminals 1, 2 and 3 when the information is transmitted.

The group information managing section 150 of the terminal 1, utilizing the communication control means 100, mutually communicates with the group information managing sections 250 and 350 via the respective communication control means 200 and 300 of the other terminals 2 and 3, and acquires information on the conferencing group within the network on which the terminals are present.

Figure 4:
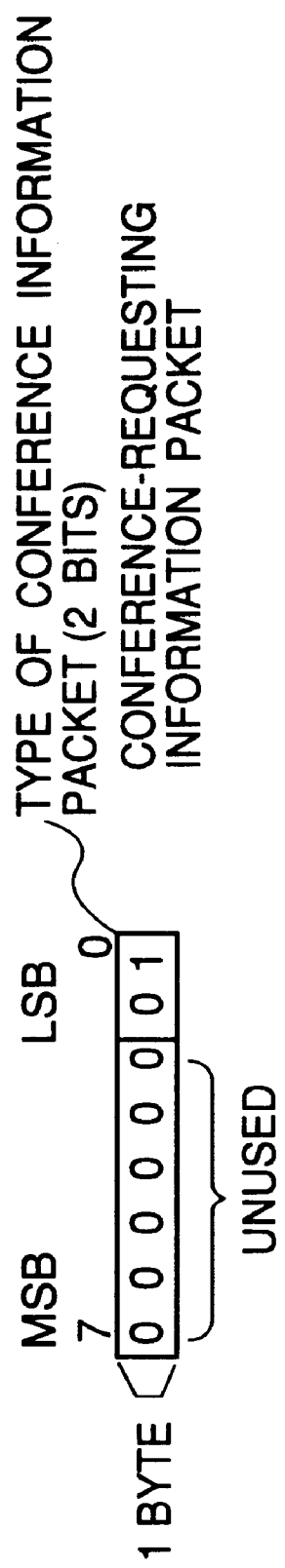
FIG. 4, a diagram intended for helping describe the embodiment of the invention, shows an example of conference-requesting information packet out of information packets to be exchanged between group information managing sections.
Figure 5:
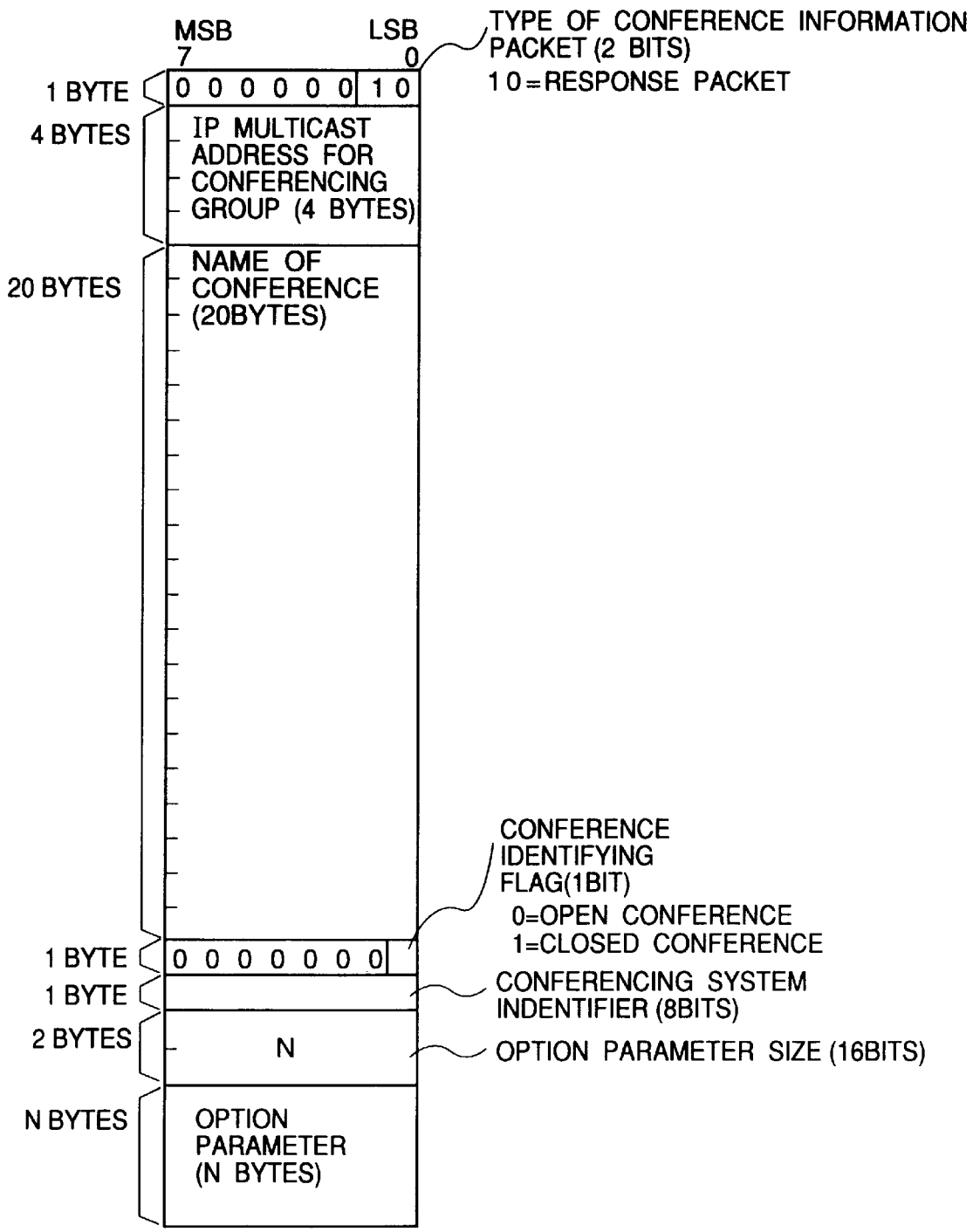
FIG. 5, a diagram intended for helping describe the embodiment of the invention, shows an example of responsive conference information packet out of information packets to be exchanged between group information managing sections.
Figure 6:
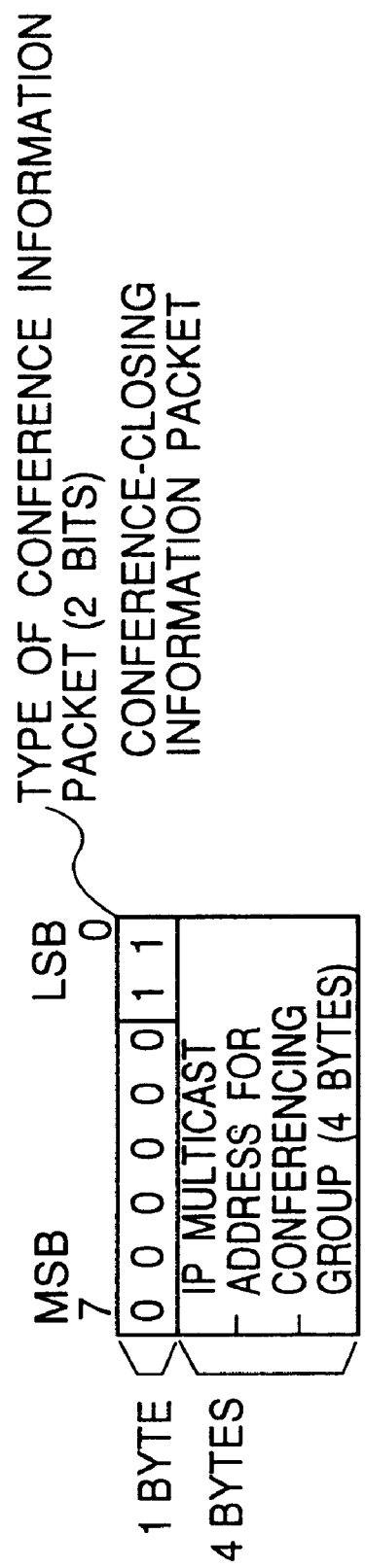
FIG. 6, a diagram intended for helping describe the embodiment of the invention, shows an example of ended conference information packet out of information packets to be exchanged between group information managing sections.

FIGS. 4, 5 and 6 illustrate typical composition of information packets exchanged between the respective group information managing sections 150, 250 and 350 of the terminals 1, 2 and 3. FIG. 4 shows a typical format of a conference-requesting information packet; FIG. 5, one of a responsive conference information packet; and FIG. 6, one of an ended conference information packet.

Referring to FIG. 4, a conference-requesting information packet is intended to request the group information managing sections 150, 250 and 350 to transmit conferencing group information held by each. It consists of one byte of data, and "01" is set as the type of conference information packet, for which two bits from the least significant bit (LSB) are assigned.

Referring to FIG. 5, a responsive conference information packet is intended to be used in transmitting, when a conference-requesting information packet has been received, currently held conference information, and consists of 36 bytes or more of data. This responsive conference information packet is also transmitted when a conference is newly held on a terminal. In this packet, as shown in FIG. 5, "10" (=responsive conference information packet) is set as the type of conference information packet, for which two bits from the LSB of the first byte are assigned, followed by the multicast address of the internet protocol (IP) for a conferencing group in the next four bytes, the name of conference in the following 20 bytes, and a conference identifying flag, which is an information bit indicating whether the conference is open or closed, in the next one byte. They are further followed by two bytes specifying the size (N bytes) of the option parameter and N bytes specifying the option parameter.

Referring to FIG. 6, an ended conference information packet, intended to notify the end of a conference held on the terminal, consists of five bytes of data, with "11" (=ended conference information packet) being set as the type of conference information packet, for which two bits from the LSB of the first byte are assigned, followed by the multicast address of the IP for a conferencing group in the next four bytes.

The conference-requesting information packet, responsive conference information packet and ended information conference packet are subjected to multicast delivery on the network from the group information managing sections 150,250 and 350 via the communication control means 100, 200 and 300, respectively.

These packets are received by the respective communication control means 100, 200 and 300 of the terminals 1, 2 and 3 connected to the network, and handed over to the respective group information managing sections 150, 250 and 350.

Figure 7:
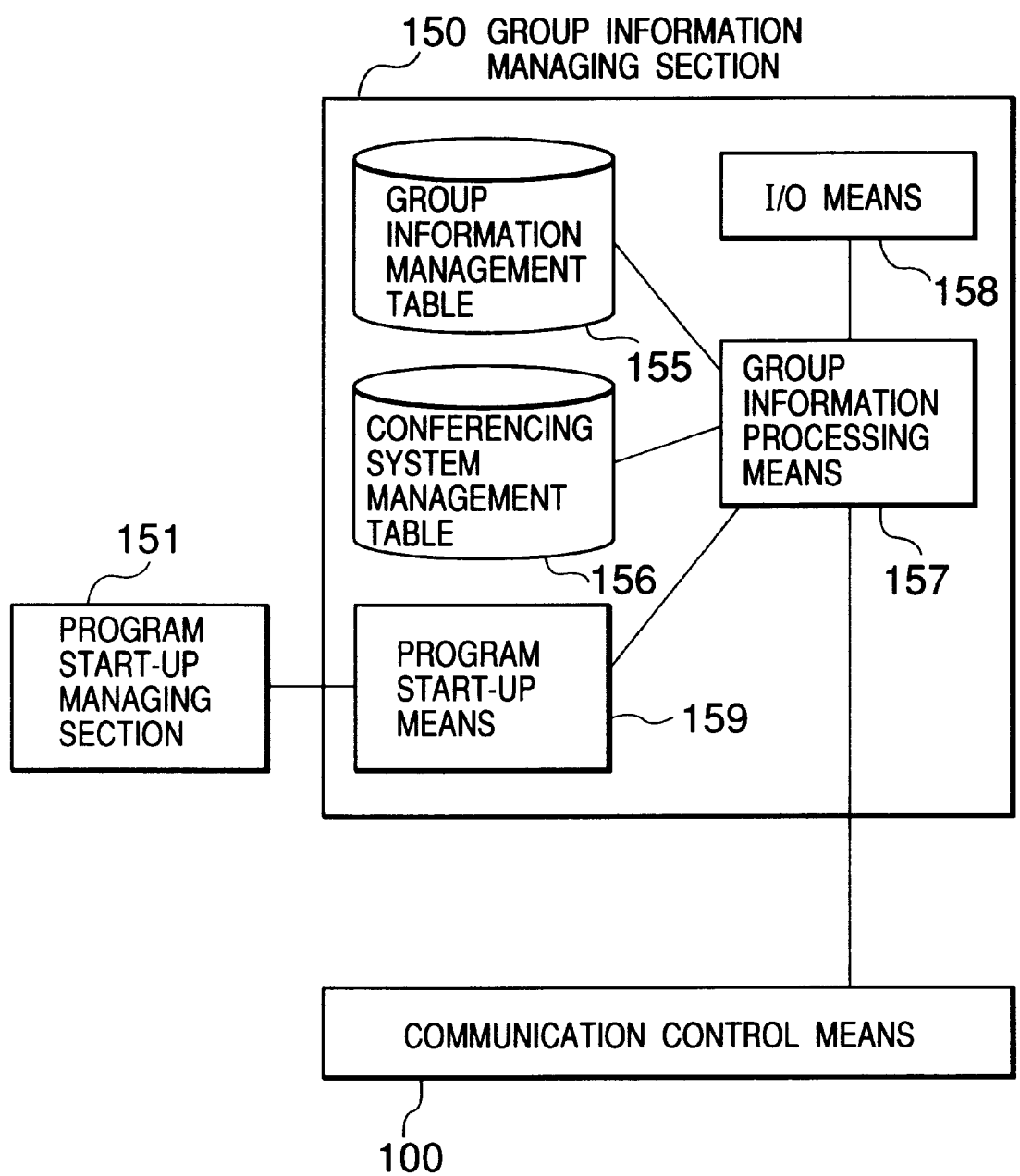
FIG. 7, a diagram intended for helping describe the embodiment of the invention, illustrates the internal configuration of the group information managing section and the relationship between the communication control means and the program start-up managing section.

Next, the internal configuration of the group information managing section 150 and the relationship between the communication control means 100 and the program start-up managing section 151 of the terminal 1 in the preferred embodiment of the present invention are illustrated in FIG. 7. As the configuration in this respect is the same at other terminals, the following description refers to the terminal 1 alone.

Referring to FIG. 7, the group information managing section 150 is provided with group information processing means 157, input/output (I/O) means 158, program start-up means 159, a group information management table 155 and a conferencing system management table 156.

The group information management table 155 holds information on the conference currently held on the network.

FIG. 8 shows an example of contents of the group information management table 155 in the embodiment of the invention. Referring to FIG. 8, one entry in the group information management table 155 consists of an IP address for the conferencing group (4 bytes), the name of conference (20 bytes), a conference identifying flag indicating whether the conference is open or closed (1 byte), a conferencing system identifier (8 bits) and an option parameter (of any desired length), and each entry is updated by addition, deletion or the like as the conference is opened or adjourned.

The group information processing means 157 updates the contents of the group information management table 155 or performs processing according to the contents of the group information management table 155 in accordance with input information from a user entered into the I/O means 158 or information sent from the communication control means 100.

The conferencing system management table 156 is intended to establish association between a conferencing system to operate on the terminal and a conferencing system identifier for exchanging information with other terminals.

FIG. 9 shows an example of contents of the conferencing system management table 156 in the preferred embodiment of the present invention. Referring to FIG. 9, one entry in the conferencing system management table 156 consists of a conferencing system identifier (8 bits), the name of conferencing system and the name of program start-up control section. For instance, the conferencing system identifier of a conferencing system whose name is System A is "1" (binary), and the name of the associated program start-up control section is "startA.exe".

The group information managing section 150 of the terminal 1, having received a conference-requesting information packet, refers to the group information management table 155, transmits in a responsive conference information packet conferencing group information on the conference held on that terminal via the communication control means 100.

Meanwhile, the section information managing group 150, having received the responsive conference information packet, adds the conferencing group stated in the received information packet to the group information management table 155 it manages, and updates the display contents on the terminal via the I/O means 158.

Further, the group information managing section 150 of the terminal 1, having received an ended conference information packet, deletes the conferencing group stated in the received information packet from the group information management table 155 it manages, and updates the display contents on the terminal via the I/O means 158.

Next will be described how this embodiment of the invention operates when a conference is held with reference to an example in which the user of the terminal 1 wishes to convene a conference.

First, the user of the terminal 1 starts up the group information managing section 150.

The group information managing section 150 lets go a conference-requesting information packet on the network via the communication control means 100, and acquires a responsive conference information packet sent in response thereto. The group information managing section 150 updates the group information management table 155 on the basis of information on the currently held conference contained in this responsive conference information packet, and displays the updated information on the terminal via the I/O means 158.

The user instructs, via the I/O means 158, the group information managing section 150 of the terminal 1 to convene a conference. The group information managing section 150 requests the user to enter necessary information for convening the conference, including the name of conference and the type of conferencing system for example.

The group information managing section 150 of the terminal 1, referring to the group information management table 155, an example of whose contents is shown in FIG. 8, selects an unused IP multicast address, and uses it as conferencing group IP multicast address.

The group information managing section 150 of the terminal 1, further referring to the conferencing system management table 156, an example of whose contents is shown in FIG. 9, acquires the name of the program start-up control section 151 for starting up the conferencing system for the conference to be convened.

Then the group information managing section 150, using the conferencing group IP multicast address as parameter, starts up from the program start-up means 159 the program start-up control section 151 whose name has been acquired.

The program start-up control section 151 starts up the intra-group control section 102.

The intra-group control section 102 readies the group communicating section 101, and waits for connection from each terminal. The intra-group control section 102 also sends necessary information for connection to the group communicating section 101 to the program start-up control section 151. The necessary information includes, for example, the host name and the port number in TCP/IP.

The program start-up control section 151, using information from the intra-group control section 102 as parameter, starts up the terminal control section 111 and, at the same time, starts up the multicast communicating section 120 with the conferencing group IP multicast address, acquired from the group information managing section, as parameter.

The started-up terminal control section 111 accomplishes connection from the point-to-point communicating means 110 to the group communicating section 101 via the communication control means 100, and registers participation from the group communicating section 101 with the intra-group control section 102.

The terminal control section 111, upon normally completing the processing of participation with the intra-group control section 102, starts up the application program 140 as required.

Thus is completed the operation to convene a conference.

Next will be described the operation of this preferred embodiment in participation in a conference with reference to an instance in which the user of the terminal 1 wishes to take part in a conference convened by the user of the terminal 2.

First, the user of the terminal 1 starts up the group information managing section 150.

The group information managing section 150 of the terminal 1 lets go a conference-requesting information packet on the network via the communication control means 100. Then, at least the group information managing section 250 operating on the terminal 2, in response to this packet, lets go on the network information on the conference convened by the user of the terminal as responsive conference information packet.

The group information managing section 150 of the terminal 1, having acquired the responsive conference information packet, updates the group information management table 155 on the basis of information included in this packet on the currently held conference, and displays the updated information on the terminal via the I/O means 158.

The user of the terminal 1, designating the conference convened by the user of the terminal 2 according to the displayed information or information obtained otherwise in advance, gives the group information managing section 150 via the I/O means 158 an instruction to participate in the conference.

The group information managing section 150 of the terminal 1, referring to the group information management table 155, checks whether or not the designated conference exists.

If the conference designated by the user does exist, the group information managing section 150 acquires the conferencing system identifier of this conference from the group information management table 155, and acquires from the conferencing system management table 156 the name of the program start-up control section 151 to start up the conferencing system for the conference to take part in.

The group information managing section 150 then starts up the program start-up control section 151, whose name has been acquired, from the program start-up means 159 with the conferencing group IP multicast address, obtained from the group information management table 155, and the option parameter set in the responsive conference information packet (e.g. the address information of the terminal having convened the conference) as start-up parameters.

The program start-up control section 151, in accordance with the information provided as parameters at the time of start-up, starts up the terminal control section 111 and, at the same time, starts up the multicast communicating section 120 with the conference group IP multicast address, provided at the time of start-up, as parameter.

The started-up terminal control section 111 is connected from the point-to-point communicating section 110 to the group communicating section 201 of the terminal 2 via the respective communication control means 100 and 200 of the terminals 1 and 2, and registers participation with the intra-group control section 202 of the terminal 2.

The terminal control section 111 of the terminal 1, upon normal completion of processing for participation with the intra-group control section 202 of the terminal 2, starts up the application program of the terminal 1 as required.

This completes the operation for participation in the conference.

Incidentally, if the terminal intending to have communication is not connected to the same network as the other party or parties to the intended communication are, communication between the terminals first of all requires the establishment of a communication path between them. Conceivable modes of communication to be established include radio communication.

If there are more than one communication path that can be established, the path to be used should be selected. If, for instance, radio communication is to be used, there still are differences in modulation and communication systems. Even if the same systems are used, there still are a number of paths that may be set, depending on a difference in frequency or some other respect.

Next will be described, as another preferred embodiment of the present invention, the communication control means 100 of the terminal 1 to be used where a plurality of communication paths are available.

Figure 10:
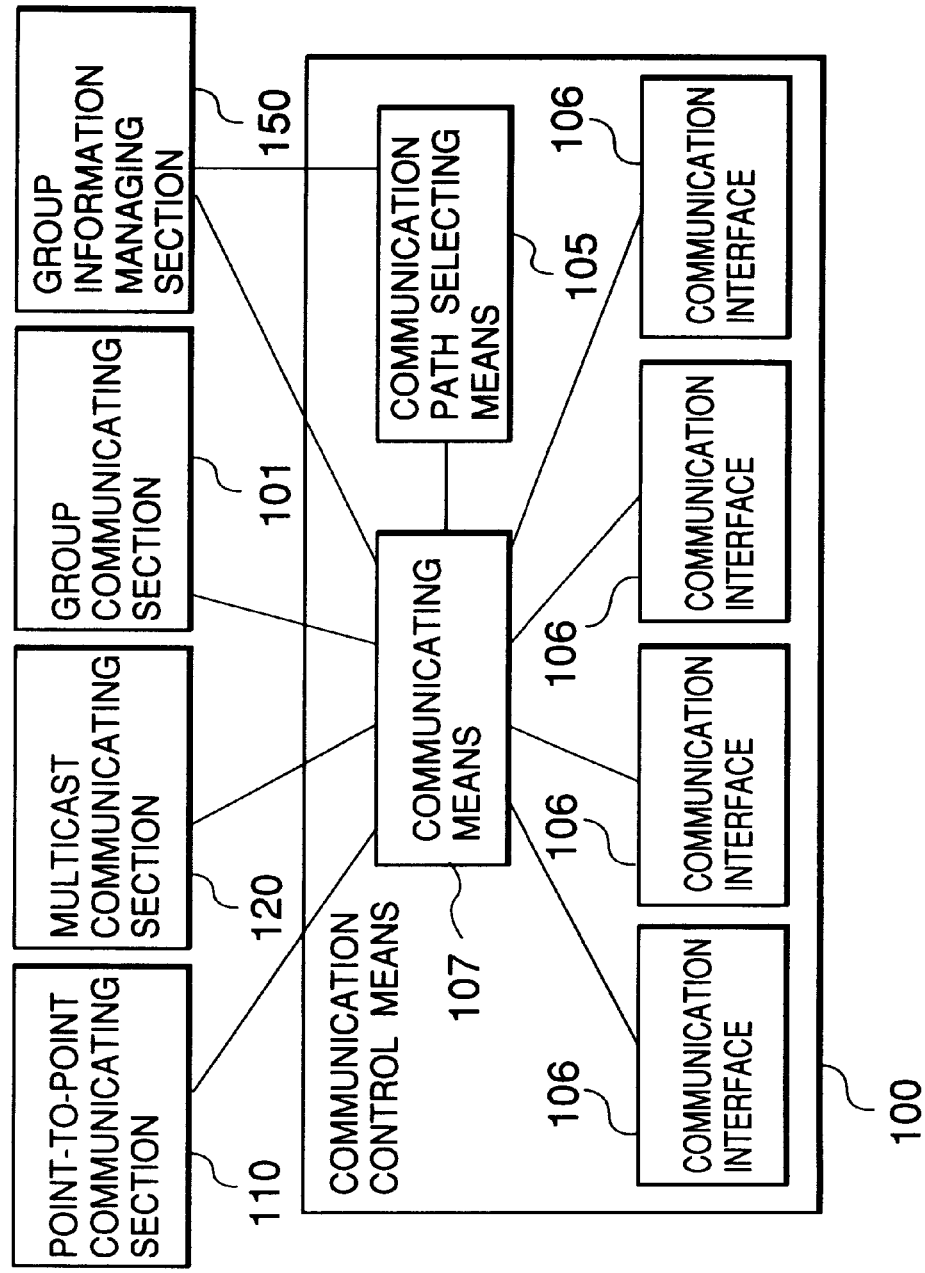
FIG. 10, a diagram intended for helping describe another embodiment of the invention, shows an example of configuration of communication control means to be used where there are a plurality of communication paths.
Figure 11:
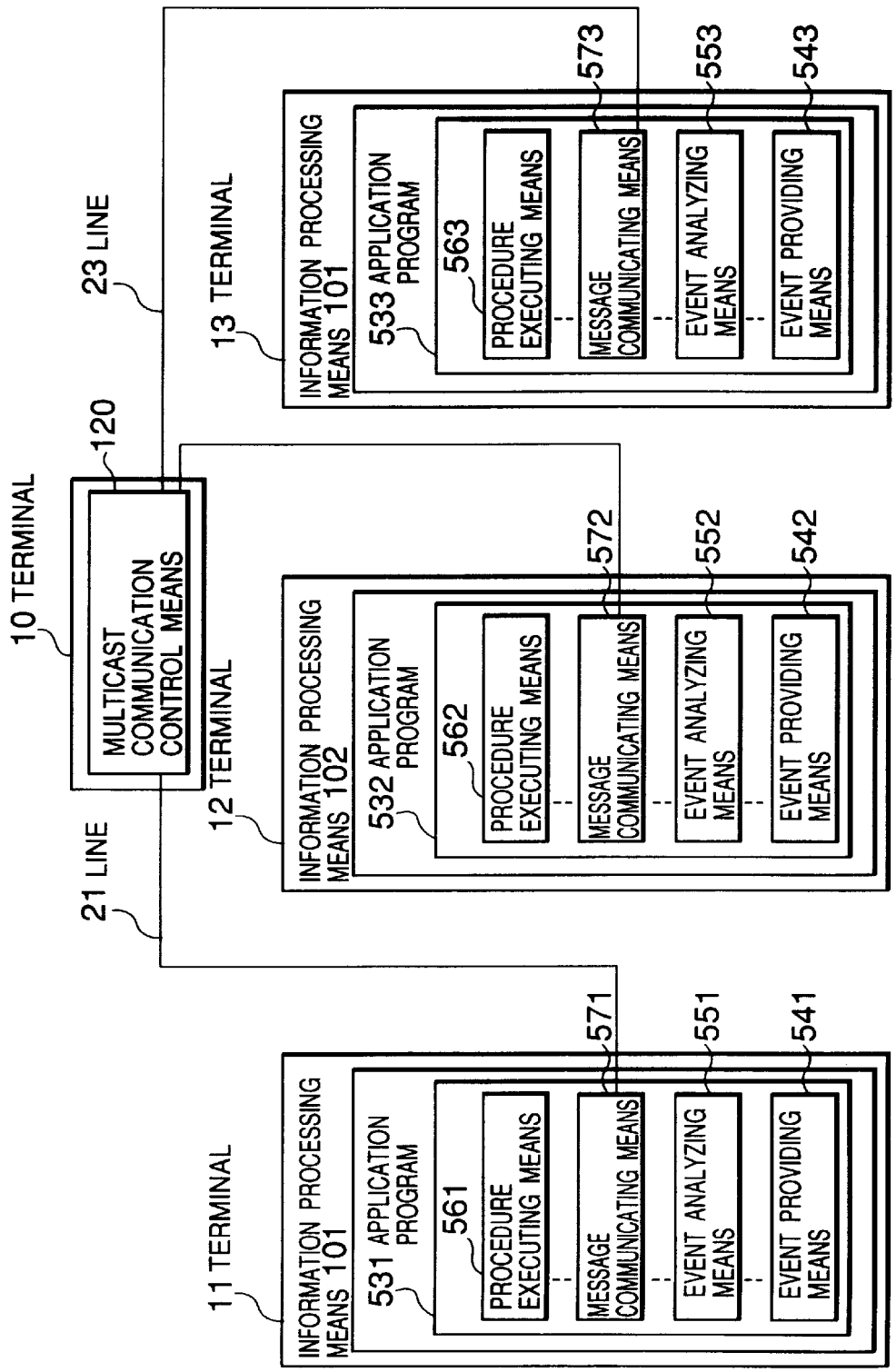
FIG. 11 is a block diagram of one example of application sharing system according to the prior art.

Referring to FIG. 10, the communication control means 10 consists of communication path selecting means 105, communicating means 107 and a plurality of communication interfaces 106.

The point-to-point communicating section 110, multicast communicating section 120, group communicating section 101 and group information managing section 150 accomplishes communication with other terminals from the communicating means 107 via a communication interface 106.

The group information managing section 150 instructs the communication path selecting means 105 as to which communication interface 106 should be used by the communicating means 107. The communicating means 107 determines the communication interface 106 via which to send out information in accordance with the instruction by the communication path selecting means 105.

Suppose the user of the terminal 1, for instance, then starts up the group information managing section 150 with an intention to convene a conference.

The group information managing section 150 of the terminal 1 designates, vis-a-vis the communication path selecting means 105, the first communication interface 106. After that, the group information managing section 150 lets go a conference-requesting information packet on the network via the communication interface 106 designated by the communicating means 107.

The group information managing section 150, having acquired a responsive conference information packet, updates the group information management table 155, and displays information it holds on the terminal via the I/O means 158. Then, in addition to the information illustrated in FIG. 8, information on the choice of the communication interface 106 via which the information has been obtained is also recorded in the group information management table 155.

The user instructs, via the I/O means 158, the group information managing section 150 to convene a conference. The group information managing section 150 requests the user to give necessary information for convening the conference. This information may be, for example, the name of conference and/or the type of conferencing system.

The group information managing section 150 refers to the group information management table 155 and, if communication with other terminals is possible and there is any unused communication path, instructs the communication path selecting means 105 to select the communication interface 106 for using that communication path. Otherwise, it selects one of the available communication paths, and gives an output to the communication path selecting means 105 to select the communication interface 106 for using that communication path. It further selects an unused IP multicast address, and uses it as conferencing group IP multicast address.

Further, the group information managing section 150, referring to the conferencing system management table 156, acquires the name of the program start-up control section 151 for actuating the conferencing system for the conference to be convened. With the conferencing group IP multicast address as parameter, it starts up the program start-up control section 151, whose name has been acquired, from the program start-up means 159.

The operation of the program start-up control section 151 after the start-up is the same as that in convening a conference when the communication path is set in advance.

Where there are a plurality of communication paths as in this instance, the group information managing section 150 operates so as to select the path on which the quantity of communication can be minimized.

Further suppose that the user of the terminal 1, for example, starts up the group information managing section 150 with an intention to participate in a conference.

The group information managing section 150 of the terminal 1 designates, vis-a-vis the communication path selecting means 105, the first communication interface 106. After that, the group information managing section 150 lets go a conference-requesting information packet on the network via the communication interface 106 designated by the communicating means 107.

The group information managing section 150, having acquired a response packet, displays the information it holds on the terminal via the I/O means 158. Then, in addition to the information illustrated in FIG. 8, information on the choice of the communication interface 106 via which the information has been obtained is also recorded in the group information management table 155.

The user of the terminal 1 instructs, designating the conference convened by the user of the terminal 2 on the basis of displayed information or information otherwise known in advance, the group information managing section 150 via the I/O means 158 to participate in the conference.

The group information managing section 150, referring to the group information management table 155, checks whether or not the designated conference exists.

If the conference designated by the user is found in the group information management table 155, an instruction is given to the communication path selecting means 105 to select the communication interface 106 for using the communication path used by this conference. Next, the group information managing section 150 acquires the conferencing system identifier of this conference, and further acquires from the conferencing system management table 156 the name of the program start-up control section 151 to start up the conferencing system for the conference to take part in. The group information managing section 150 then starts up the program start-up control section 151, whose name has been acquired, from the program start-up means 159 with the conferencing group IP multicast address, obtained from the group information management table 155, and the option parameter as start-up parameters.

The operation of the program start-up control section 151 after the start-up is the same as that in participating in a conference when the communication path is set in advance.

Finally, the operation to take place when a user participating in a conference retires from the conference is described.

If, for instance, the user of the terminal 1 is to retire from a conference, the user gives an instruction to the terminal control section 111 of the terminal 1.

The terminal control section 111, having fully completed the application program 140, notifies the program start-up managing section 151 of its own completion, and ends together with the point-to-point communicating section.

Notified by the terminal control section 111 of its completion, the program start-up control section 151 ends the multicast communicating section 120.

Further, if the conference was convened by the terminal 1, a similar instruction is also given to the intra-group control section 102.

The program start-up control section 151, having confirmed the completion of every section whose completion was instructed, ends itself. The group information managing section 150, in response to the completion of the program start-up managing section 151, updates the group information management table 155, and delivers an conference-closing information packet. Having received this packet, the respective group information managing sections 250 and 350 of the terminals 2 and 3 update their respective group information management tables 255 and 355.

Further, upon retirement of the user of the terminal 1 who convened the conference, the intra-group control section 102, having been given an instruction to end, notifies from the group communicating section 101, the end of the conference to the respective terminal control sections 211 and 311 of the terminals 2 and 3 via the communication control means 100, 200 and 300 of the terminals 1, 2 and 3 and the point-to-point communicating sections 210 and 310 of the terminals 2 and 3, respectively.

Upon receipt of this notification, the terminal control sections 211 and 311 of the terminals 2 and 3 end themselves after ending their respective application programs 240 and 340.

This completes the operation that takes place when a user participating in a conference retires from the conference.

As hitherto described, an application sharing system according to the present invention has the effect of not only achieving higher communication efficiency but also realizing freer management of conferences by making possible selective use of the simultaneous communicating function of the network and consecutive multicast delivery by multicast communication control means for communication between terminals.

The invention also has the effect of realizing automation of the system as well as simplifying operations and increasing the handling ease and convenience of users in using the system.

The invention further makes it possible to alter the system according to the conferencing group to participate in by exchanging conferencing group information including the type of conferencing system.

Equipped with means to select the most suitable communication path where there are a plurality of communication paths available to the network, the application sharing system according to the invention has the further effect of making possible configuration of a conferencing group utilizing the most suitable path.

Furthermore, the invention has the additional effect of dispensing with any additional apparatus for managing conferences and making possible composition of a conferencing group by merely readying user terminals, because each user terminal is provided with a conference managing function and can utilize that function as required.

What is claimed is:

1. An application sharing system composed of a plurality of terminals connected via a network, wherein each of said plurality of terminals comprises:

a group information managing section for entering, at the instruction of a user, information including an address for convening or participating in a conferencing group;

a program start-up managing section, started up by said group information managing section with said information including said address as a parameter, for controlling a program for convening or participating in said conferencing group;

an intra-group control section, started up by said program start-up managing section when said information including said address is entered from said group information managing section, for waiting for connection from other terminals;

a terminal control section, started up by said program start-up managing section with said information including said address as a parameter, for registering participation in said conferencing group by effecting connection to said intra-group control section of a terminal where a conferencing group is being convened out of said plurality of terminals;

plurality of communication interface means for connecting to said network; and a communication path selecting means for selecting one of said plurality of connection interface means when instructed by said group information managing section, wherein each of said communication interface means is selectable by the communication path selecting means, and wherein said group information managing section stores the selected one of said plurality of connection interface means in a group information management table so that an optimized connection interface means is predetermined for further communication initiated by said group information managing section.

2. An application sharing system, as claimed in claim 1, wherein:

said intra-group control section returns information for connection to itself, to said program start-up managing section;

said program start-up managing section hands over to said terminal control section said information for connection received from said intra-group control section as said information for convening said conference; and said terminal control section completes the convening of the conferencing group by accomplishing connection to said intra-group control section of its own terminal on the basis of the information handed over from said program start-up managing section.

3. An application sharing system, as claimed in claim 2, wherein each of said plurality of terminals further comprises:

an application processing section for executing an application program started up by said terminal control section;

a point-to-point communicating section for receiving transmit information and transmit destination terminal information from said application processing section; and a group communicating section, started up by said intra-group control section, for transmitting, upon receiving said transmit information and transmit destination terminal information from said point-to-point communicating section, the transmit information to a terminal indicated by the transmit destination terminal information; wherein said point-to-point communicating section receives transmit information from said group communicating section of its own terminal or any other terminal, and hands over the transmit information to said application processing section of its own terminal.

4. An application sharing system, as claimed in claim 2, wherein each of said plurality of terminals further comprises:

an application processing section for executing an application program started up by said terminal control section; and a multicast communicating section for receiving transmit information and receiving side terminal information from said application processing section and transmitting the transmit information augmented with the receiving side terminal information; wherein:

said multicast communicating section receives transmit information from said multicast communicating section of another terminal, and hands over to said application processing section of its own terminal only the information to be received by its own terminal on the basis of receiving side terminal information added to the transmit information.

5. An application sharing system, as claimed in claim 2, wherein each of said plurality of terminals further comprises:

an application processing section for executing an application program started up by said terminal control section;

a point-to-point communicating section for receiving transmit information and transmit destination terminal information from said application processing section;

a group communicating section, started up by said intra-group control section, for transmitting, upon receiving said transmit information and transmit destination terminal information from said point-to-point communicating section, the transmit information to a terminal indicated by the transmit destination terminal information; and a multicast communicating section for receiving transmit information and receiving side terminal information from said application processing section and transmitting the transmit information augmented with the receiving side terminal information, wherein said point-to-point communicating section receives transmit information from said group communicating section of its own terminal or any other terminal, and hands over the transmit information to said application processing section of its own terminal; and said multicast communicating section receives transmit information from said multicast communicating section of its own terminal or any other terminal, and hands over to said application processing section of its own terminal only the information to be received by its own terminal on the basis of receiving side terminal information added to the transmit information.

6. An application sharing system, as claimed in claim 5, wherein:

said terminal control section, when the user instructs retirement from a conferencing group, ends itself as well as ending said application processing section and said point-to-point communicating section;

said program start-up managing section, upon ending of said terminal control section, completes retirement from the conferencing group by ending said multicast communicating section and ending itself as well and, if its own terminal convened the conferencing group, instructs said intra-group control section to end;

said intra-group control section, when instructed by said program start-up managing section to end, instructs the group communicating section to end; and said group communicating section, when instructed by said intra-group control group, notifies other terminals of the end of the conferencing group and also ends itself.

7. An application sharing system, as claimed in claim 1, wherein:

said group information managing section enters into said program start-up managing section information for connection to the terminal where a conferencing group is being convened as information for participation in said conferencing group;

said program start-up managing section hands over to said terminal control section said information for connection entered from said group information managing section as said information for participating in said conferencing group; and said terminal control section completes participation in the conferencing group by accomplishing connection to said intra-group control section of the terminal where the conferencing group is being convened on the basis of the information handed over from said program start-up managing section.

8. An application sharing system, as claimed in claim 7, wherein each of said plurality of terminals further comprises:

an application processing section for executing an application program started up by said terminal control section;

a point-to-point communicating section for receiving transmit information and transmit destination terminal information from said application processing section; and a group communicating section, started up by said intra-group control section, for transmitting, upon receiving said transmit information and transmit destination terminal information from said point-to-point communicating section, the transmit information to a terminal indicated by the transmit destination terminal information; wherein said point-to-point communicating section receives transmit information from said group communicating section of its own terminal or any other terminal, and hands over the transmit information to said application processing section of its own terminal.

9. An application sharing system, as claimed in claim 3, wherein each of said plurality of terminals further comprises:

an application processing section for executing an application program started up by said terminal control section; and a multicast communicating section for receiving transmit information and receiving side terminal information from said application processing section and transmitting the transmit information augmented with the receiving side terminal information; wherein:

said multicast communicating section receives transmit information from said multicast communicating section of another terminal, and hands over to said application processing section of its own terminal only the information to be received by its own terminal on the basis of receiving side terminal information added to the transmit information.

10. An application sharing system, as claimed in claim 7, wherein each of said plurality of terminals further comprises:

an application processing section for executing an application program started up by said terminal control section;

a point-to-point communicating section for receiving transmit information and transmit destination terminal information from said application processing section;

a group communicating section, started up by said intra-group control section, for transmitting, upon receiving said transmit information and transmit destination terminal information from said point-to-point communicating section, the transmit information to a terminal indicated by the transmit destination terminal information; and a multicast communicating section for receiving transmit information and receiving side terminal information from said application processing section and transmitting the transmit information augmented with the receiving side terminal information, wherein said point-to-point communicating section receives transmit information from said group communicating section of its own terminal or any other terminal, and hands over the transmit information to said application processing section of its own terminal; and said multicast communicating section receives transmit information from said multicast communicating section of its own terminal or any other terminal, and hands over to said application processing section of its own terminal only the information to be received by its own terminal on the basis of receiving side terminal information added to the transmit information.

11. An application sharing system, as claimed in claim 10, wherein:

said terminal control section, when the user instructs retirement from a conferencing group, ends itself as well as ending said application processing section and said point-to-point communicating section;

said program start-up managing section, upon ending of said terminal control section, completes retirement from the conferencing group by ending said multicast communicating section and ending itself as well and, if its own terminal convened the conferencing group, instructs said intra-group control section to end;

said intra-group control section, when instructed by said program start-up managing section to end, instructs the group communicating section to end; and said group communicating section, when instructed by said intra-group control group, notifies other terminals of the end of the conferencing group and also ends itself.

12. An application sharing system, as claimed in claim 1, wherein:

said intra-group control section returns information for connection to itself, to said program start-up managing section;

said group information managing section enters into said program start-up managing section information for connection to the terminal where a conferencing group is being convened as information for participation in said conferencing group;

said program start-up managing section hands over to said terminal control section said information for connection entered from said intra-group control section as said information for convening said conference and, at the same time, hands over to said terminal control section said information for connection entered from said group information managing group as information for participating in said conferencing group; and said terminal control section completes the convening of the conferencing group by accomplishing connection to said intra-group control section of its own terminal on the basis of information handed over from said program start-up managing section and, at the same time, completes participation in the conferencing group by accomplishing connection to said intra-group control section of the terminal where the conferencing group is being convened on the basis of the information handed over from said program start-up managing section.

13. An application sharing system, as claimed in claim 12, wherein each of said plurality of terminals further comprises:

an application processing section for executing an application program started up by said terminal control section;

a point-to-point communicating section for receiving transmit information and transmit destination terminal information from said application processing section; and a group communicating section, started up by said intra-group control section, for transmitting, upon receiving said transmit information and transmit destination terminal information from said point-to-point communicating section, the transmit information to a terminal indicated by the transmit destination terminal information; wherein said point-to-point communicating section receives transmit information from said group communicating section of its own terminal or any other terminal, and hands over the transmit information to said application processing section of its own terminal.

14. An application sharing system, as claimed in claim 12, wherein each of said plurality of terminals further comprises:

an application processing section for executing an application program started up by said terminal control section; and a multicast communicating section for receiving transmit information and receiving side terminal information from said application processing section and transmitting the transmit information augmented with the receiving side terminal information; wherein:

said multicast communicating section receives transmit information from said multicast communicating section of another terminal, and hands over to said application processing section of its own terminal only the information to be received by its own terminal on the basis of receiving side terminal information added to the transmit information.

15. An application sharing system, as claimed in claim 12, wherein each of said plurality of terminals further comprises:

an application processing section for executing an application program started up by said terminal control section;

a point-to-point communicating section for receiving transmit information and transmit destination terminal information from said application processing section;

a group communicating section, started up by said intra-group control section, for transmitting, upon receiving said transmit information and transmit destination terminal information from said point-to-point communicating section, the transmit information to a terminal indicated by the transmit destination terminal information; and a multicast communicating section for receiving transmit information and receiving side terminal information from said application processing section and transmitting the transmit information augmented with the receiving side terminal information, wherein said point-to-point communicating section receives transmit information from said group communicating section of its own terminal or any other terminal, and hands over the transmit information to said application processing section of its own terminal; and said multicast communicating section receives transmit information from said multicast communicating section of its own terminal or any other terminal, and hands over to said application processing section of its own terminal only the information to be received by its own terminal on the basis of receiving side terminal information added to the transmit information.

16. An application sharing system, as claimed in claim 15, wherein:

said terminal control section, when the user instructs retirement from a conferencing group, ends itself as well as ending said application processing section and said point-to-point communicating section;

said program start-up managing section, upon ending of said terminal control section, completes retirement from the is conferencing group by ending said multicast communicating section and ending itself as well and, if its own terminal convened the conferencing group, instructs said intra-group control section to end;

said intra-group control section, when instructed by said program start-up managing section to end, instructs the group communicating section to end; and said group communicating section, when instructed by said intra-group control group, notifies other terminals of the end of the conferencing group and also ends itself.

17. An application sharing system, as claimed in claim 1, wherein each of said plurality of terminals further comprises:

an application processing section for executing an application program started up by said terminal control section;

a point-to-point communicating section for receiving transmit information and transmit destination terminal information from said application processing section; and a group communicating section, started up by said intra-group control section, for transmitting, upon receiving said transmit information and transmit destination terminal information from said point-to-point communicating section, the transmit information to a terminal indicated by the transmit destination terminal information; wherein said point-to-point communicating section receives transmit information from said group communicating section of its own terminal or any other terminal, and hands over the transmit information to said application processing section of its own terminal.

18. An application sharing system, as claimed in claim 1, wherein each of said plurality of terminals further comprises:

an application processing section for executing an application program started up by said terminal control section; and a multicast communicating section for receiving transmit information and receiving side terminal information from said application processing section and transmitting the transmit information augmented with the receiving side terminal information; wherein:

said multicast communicating section receives transmit information from said multicast communicating section of another terminal, and hands over to said application processing section of its own terminal only the information to be received by its own terminal on the basis of receiving side terminal information added to the transmit information.

19. An application sharing system, as claimed in claim 1, wherein each of said plurality of terminals further comprises:

an application processing section for executing an application program started up by said terminal control section;

a point-to-point communicating section for receiving transmit information and transmit destination terminal information from said application processing section;

a group communicating section, started up by said intra-group control section, for transmitting, upon receiving said transmit information and transmit destination terminal information from said point-to-point communicating section, the transmit information to a terminal indicated by the transmit destination terminal information; and a multicast communicating section for receiving transmit information and receiving side terminal information from said application processing section and transmitting the transmit information augmented with the receiving side terminal information, wherein said point-to-point communicating section receives transmit information from said group communicating section of its own terminal or any other terminal, and hands over the transmit information to said application processing section of its own terminal; and said multicast communicating section receives transmit information from said multicast communicating section of its own terminal or any other terminal, and hands over to said application processing section of its own terminal only the information to be received by its own terminal on the basis of receiving side terminal information added to the transmit information.

20. An application sharing system, as claimed in claim 19, wherein:

said terminal control section, when the user instructs retirement from a conferencing group, ends itself as well as ending said application processing section and said point-to-point communicating section;

said program start-up managing section, upon ending of said terminal control section, completes retirement from the conferencing group by ending said multicast communicating section and ending itself as well and, if its own terminal convened the conferencing group, instructs said intra-group control section to end;

said intra-group control section, when instructed by said program start-up managing section to end, instructs the group communicating section to end; and said group communicating section, when instructed by said intra-group control group, notifies other terminals of the end of the conferencing group and also ends itself.

* * * * *